US012638694B2

(12) United States Patent
Matsuoka

(10) Patent No.: US 12,638,694 B2
(45) Date of Patent: May 26, 2026

(54) SPECTACLE LENS AND METHOD FOR DESIGNING SAME

(71) Applicant: HOYA LENS THAILAND LTD., Pathumthani (TH)

(72) Inventor: Shohei Matsuoka, Tokyo (JP)

(73) Assignee: HOYA LENS THAILAND LTD., Pathumthani (TH)

( * ) Notice: Subject to any disclaimer, the term of this patent is extended or adjusted under 35 U.S.C. 154(b) by 348 days.

(21) Appl. No.: 18/273,465

(22) PCT Filed: Jan. 12, 2022

(86) PCT No.: PCT/JP2022/000621
§ 371 (c)(1),
(2) Date: Jul. 20, 2023

(87) PCT Pub. No.: WO2022/190610
PCT Pub. Date: Sep. 15, 2022

(65) Prior Publication Data
US 2024/0319520 A1 Sep. 26, 2024

(30) Foreign Application Priority Data

Mar. 8, 2021 (JP) ................................. 2021-036401

(51) Int. Cl.
*G02C 7/02* (2006.01)
*G02C 7/06* (2006.01)

(52) U.S. Cl.
CPC .............. *G02C 7/022* (2013.01); *G02C 7/027* (2013.01); *G02C 7/028* (2013.01); *G02C 7/066* (2013.01); *G02C 2202/24* (2013.01)

(58) Field of Classification Search
CPC ........ G02C 7/022; G02C 7/027; G02C 7/028; G02C 7/066; G02C 2202/24; G02C 7/024; G02C 7/06
See application file for complete search history.

(56) References Cited

U.S. PATENT DOCUMENTS

| | | | |
|---|---|---|---|
| 2017/0131567 A1 | 5/2017 | To et al. | |
| 2017/0184875 A1 | 6/2017 | Newman | |
| 2022/0082864 A1 | 3/2022 | Qi et al. | |

FOREIGN PATENT DOCUMENTS

| | | | |
|---|---|---|---|
| CN | 110426860 A | 11/2019 | |
| CN | 210690971 U | 6/2020 | |
| JP | 2021005081 A | 1/2021 | |
| WO | 2016/168746 A1 | 10/2016 | |
| WO | 2020078693 A1 | 4/2020 | |
| WO | 2020/180817 A1 | 9/2020 | |
| WO | WO-2020262569 A1 * | 12/2020 | ............... G02C 7/06 |

OTHER PUBLICATIONS

PCT/JP2022/000621, "International Preliminary Report on Patentability", Sep. 21, 2023, 5 pages.
PCT/JP2022/000621, "English Translation of International Search Report", Mar. 29, 2022, 2 pages.
Jan. 8, 2025 Extended European Search Report issued in European Patent Application No. 22766578.3.

* cited by examiner

*Primary Examiner* — Tuyen Tra
(74) *Attorney, Agent, or Firm* — Oliff PLC

(57) ABSTRACT

A spectacle lens, including: a base region; and a plurality of defocus regions surrounded by the base region.

10 Claims, 11 Drawing Sheets

FIG. 1A
FIG. 1B
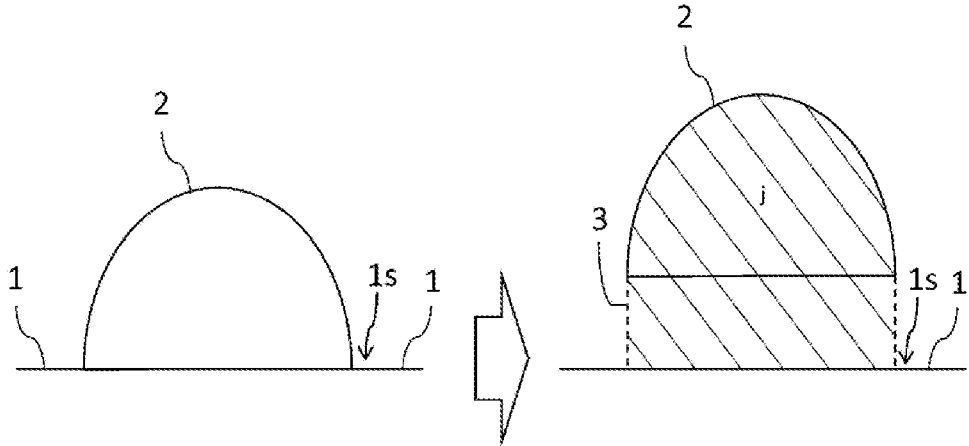
FIG. 1C
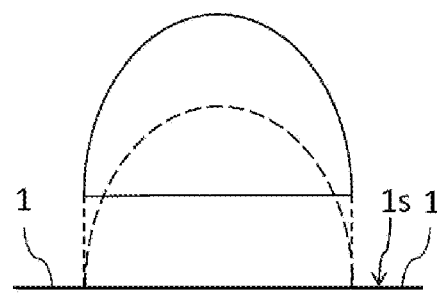

FIG. 2A                  FIG. 2B
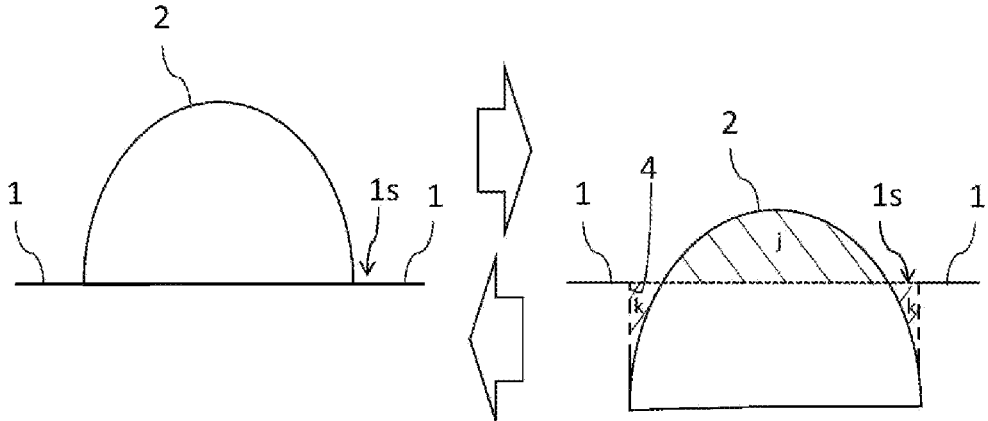
FIG. 2C
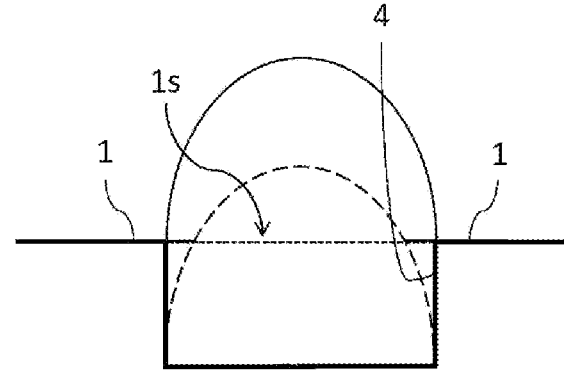

FIG. 3A                    FIG. 3B
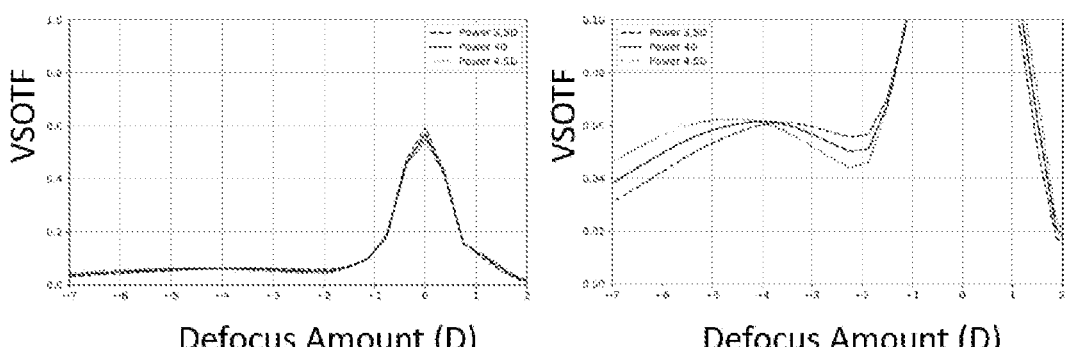
FIG. 4A                    FIG. 4B
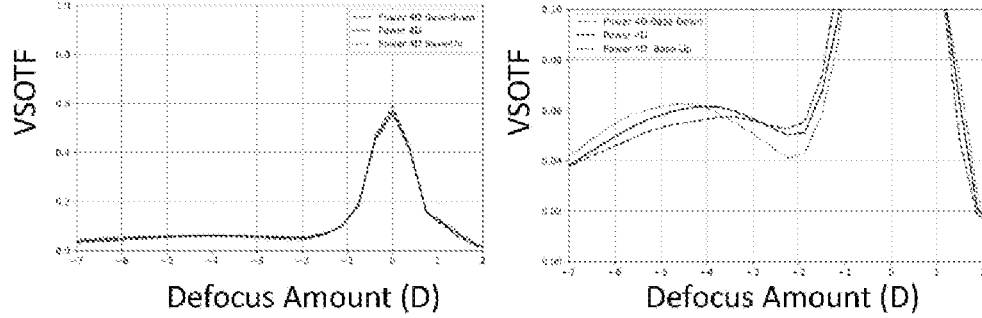

SPECTACLE LENS AND METHOD FOR DESIGNING SAME

CROSS-REFERENCE TO RELATED APPLICATIONS

This application is the National Stage of International Application No. PCT/JP2022/000621, filed Jan. 12, 2022, which claims priority to Japanese Patent Application No. 2021-036401, filed Mar. 8, 2021, and the contents of which is incorporated by reference.

BACKGROUND

Technical Field

The present disclosure relates to a spectacle lens and a method for designing the same.

Description of Related Art

As a spectacle lens that suppresses a progression of refractive error such as myopia, there is a spectacle lens in which a plurality of island-shaped regions are formed on a lens, the island-shaped regions having a refractive power that is more positive than a prescribed refractive power (see Patent document 1, for example). Hereinafter, these island-shaped regions are called defocus regions.

According to the spectacle lens with this configuration, out of light fluxes that incident from an object-side surface and emitted from an eyeball-side surface, the light flux that has passed through a region other than the defocus region, is focused on a wearer's retina, but a light flux that has passed through the portion of the defocus region is focused in front of the retina, thereby suppressing the progression of myopia.

In this specification, a forward direction where there is an object to be visually recognized in an optical axis direction, is referred to as a front side, and a direction opposite to the front side and a rear side in the optical axis direction, that is, a depth direction from a spectacle lens toward an eyeball, is referred to as a back side.

PRIOR ART DOCUMENT

Patent Document

[Patent Document 1] US Application Publication No. 2017/0131567

SUMMARY OF THE DISCLOSURE

Problem to be Solved by the Disclosure

A best focus position (Best Focal) that is ultimately given to a wearer differs depending on a position of the defocus region on a spectacle lens on/from which the light flux incident and emitted. The reason is as follows. The best focus position changes depending on the degree of the progression of myopia, the state of a choroid, the angle of incidence during wearing, the aberration of an eye (curvature of field), and the curvature of a retina, which differ depending on the wearer. In many cases, the degree of change increases as moving away from the center of a lens. That is, a defocus power to be given to the wearer varies depending on the wearer or the position of the lens. The best focus position is also simply referred to as a "focus position".

The "focus position" in this specification means a focal point. However, the focus position has a slightly different meaning from a geometric focal point determined by a shape of the defocus region (for example, a spherical shape with a curvature of radius R). The focus position is the best position for a wave optics contrast in consideration of frequency characteristics of an eye (for example, having a peak at low frequencies).

Generally, the focus position varies depending on a concept and application, such as a position where the contrast of a target spatial frequency is the highest, a position where energy is the highest, and a position where the variation of light is the smallest. Therefore, it is preferable to flexibly deal with the defocus region that brings a focus position to a wearer. Focusing on the fact that the retina is a collection of cells that respond to specific spatial frequencies, the present inventor has adopted the above-described definition of the focus position.

According to an embodiment of the present disclosure, an aspect of the present disclosure is to provide a technique of flexibly changing a focus position that a defocus region brings to a wearer, depending on a position on a spectacle lens. Particularly, an aspect of the present disclosure to provide a technique of flexibly changing the focus position while the surface shapes of the defocus regions are equal to each other.

Means for Solving the Problem

A first aspect of the present disclosure provides a spectacle lens, including:

a base region where a light flux incident from an object-side surface is emitted from an eyeball-side surface and converges on a retina through an eyeball; and a plurality of defocus regions surrounded by the base region and having a property that the light flux passing through at least a part of the defocus region is incident on the retina as a divergent light, the defocus region including a defocus region a provided at a predetermined position A and a defocus region b provided at a predetermined position B on a spectacle lens, wherein when a direction toward outside of a lens, which is a normal direction on a base surface, is shown by a positive sag value, and a direction toward inside of the lens, which is a normal direction on the base surface, is shown by a negative sag value, with the base surface of the base region as a reference, a sag value of a 3D shape of the defocus region b is a value in which a sag value of a 3D shape of the defocus region a is increased.

A second aspect of the present disclosure provides the spectacle lens according to the first aspect, wherein at least center points of the defocus region a and the defocus region b are in an appearance of a curved shape protruding toward outside of the lens.

A third aspect of the present disclosure provides the spectacle lens according to the second aspect, wherein a radius of curvature at the center point of the defocus region a is equal to a radius of curvature at the center point of the defocus region b.

A fourth aspect of the present disclosure provides the spectacle lens according to any one of the first to third aspects, wherein an amount of increase in the sag value of the 3D shape is constant.

A fifth aspect of the present disclosure provides the spectacle lens according to any one of the first to fourth aspects, wherein a bottom area of the defocus region a is equal to a bottom area of the defocus region b.

A sixth aspect of the present disclosure provides the spectacle lens according to any one of the first to fifth aspects, wherein the predetermined position A is a position near a periphery of the lens, and the predetermined position B is a position near a center of the lens, or the predetermined position A is a position near the center of the lens, and the predetermined position B is a position near the periphery of the lens.

A seventh aspect of the present disclosure provides the spectacle lens according to any one of the first to sixth aspects, wherein a sag value near the base region in the 3D shape of the defocus region a is negative.

An eighth aspect of the present disclosure provides the spectacle lens according to any one of the first to seventh aspects, wherein in a defocus region T that is a gathering of defocus regions with a number of 80% or more of all defocus regions and includes the defocus region b and the defocus region a, a radius of curvature at each center point is equal, and the number of defocus regions having the same sag value as that of the defocus region a is 10 to 90%, and the number of defocus regions having the same sag value as that of the defocus region b is 10 to 90%.

Preferably, the number of the gathering in the defocus region T is 90% or more, 95% or more of all defocus regions.

A ninth aspect of the present disclosure provides the spectacle lens according to the first aspects, wherein at least center points of the defocus region a and the defocus region b are in an appearance of a curved shape protruding toward outside of a lens, an amount of increase in the sag value is constant, a radius of curvature at the center point of the defocus region a and a radius of curvature at the center point of the defocus region b are equal, a bottom area of the defocus region a and a bottom area of the defocus region b are equal, the predetermined position A is a position near a periphery of the lens, and the predetermined position B is a position near a center of the lens, or the predetermined position A is a position near the center of the lens, the predetermined position B is a position near the periphery of the lens, in a defocus region T that is a gathering of defocus regions with a number of 80% or more of all defocus regions and includes the defocus region a and the defocus region b, a radius of curvature at each center point is equal, and the number of defocus regions having the same sag value as that of the defocus region a is 10 to 90%, and the number of defocus regions having the same sag value as that of the defocus region b is 10 to 90%.

Preferably, the number of the gathering in the defocus region T is 90% or more, 95% or more of all defocus regions.

A tenth aspect of the present disclosure provides the spectacle lens according to any one of the first to ninth aspects, wherein the spectacle lens is a myopia progression suppressing lens.

An eleventh aspect of the present disclosure provides a method for designing a spectacle lens including a base region where a light flux incident from an object-side surface is emitted from an eyeball-side surface and converges on a retina through an eyeball; and a plurality of defocus regions surrounded by the base region and having a property that a light flux passing through at least a part of the defocus region is incident on the retina as a divergent light, the method comprising:

increasing a sag value of a 3D shape of the defocus region so that the defocus region uplifts with respect to a base surface: or decreasing the sag value of the 3D shape of the defocus region so that the defocus region sinks with respect to the base surface; thereby changing a focus position for a wearer, depending on a position of the defocus region on a spectacle lens, wherein a direction toward outside of a lens, which is a normal direction on the base surface, is shown by a positive sag value, and a direction toward inside of the lens, which is a normal direction on the base surface, is shown by a negative sag value, with the base surface of the base region as a reference.

A twelfth aspect of the present disclosure provides the method for designing a spectacle lens according to the eleventh aspect, wherein the focus position is changed by changing a value obtained in such a way that a volume of a portion between the defocus region and the base surface and having a negative sag value is subtracted from a volume of a portion between the defocus region and the base surface and having a positive sag value, and a value thus obtained is divided by a bottom area of the defocus region.

Other aspects of the disclosure that can be combined with the above aspects are as follows.

The sag value of an entire 3D shape of the defocus region a at the predetermined position A and the sag value of an entire 3D shape of the defocus region b at the predetermined position may both be positive or negative. The sag values at the center (or the center of gravity) in plan view may both be positive or negative.

At least the center point of the 3D shape of the defocus region a, and at least the center point of the 3D shape of the defocus region b may both be spherical.

The sag value of the entire 3D shape of the defocus region a may be positive.

When it is assumed that the 3D shape of the defocus region a and the 3D shape of the defocus region b are aligned and superimposed at the center (or center of gravity) in plan view and on the base surface, it is preferable that the 3D shape of the defocus region b exists in a +Z direction when viewed from the 3D shape of the defocus region a.

In the above assumption, it is preferable that the 3D shape of the defocus region a does not protrude from the 3D shape of the defocus region b. Preferably, both shapes do not contact each other when the above superimposition is assumed.

A relationship between the sag values may also be satisfied in the case of the lens substrate on which the defocus regions a and b are formed. The relationship between the sag values may be satisfied by forming a hard coat film on the lens substrate, or may be satisfied by forming the hard coat film on an antireflection film. When forming the hard coat film, the hard coat film may serve as realizing the defocus regions a and b, even on the lens substrate with no defocus regions a and b thereon.

The predetermined position A may be the nose-side position, and the predetermined position B may be the ear-side position. Conversely, the predetermined position A may be the ear-side position, and the predetermined position B may be the nose-side position. In either case, the sag value near the base region may be negative in the 3D shape of the defocus region a at the predetermined position A.

Substantially circular defocus regions may be arranged in an island shape (that is, separated from each other without being adjacent to each other) at equal intervals in the circumferential and radial directions around a center portion of the spectacle lens. As an example of the arrangement of the defocus regions in plan view, there is an example in which the defocus regions are arranged independently and discretely so that the center of each defocus region becomes the vertex of an equilateral triangle (the center of each defocus region is placed at the vertex of a honeycomb structure). This arrangement is also called a "hexagonal arrangement". This specification focuses on this example.

More than half of the plurality of defocus regions (all defocus regions) are preferably arranged in the same cycle in plan view. An example of patterns with the same cycle is the hexagonal arrangement. The direction of the cycle may be circumferential and/or radial. The number of the defocus regions is preferably 80% or higher, more preferably 90% or higher, even more preferably 95% or higher.

When the sag value (eg, maximum sag value) of the 3D shape of the defocus region a is the smallest among all defocus regions, it is preferable to satisfy a relationship between the sag values as follows: "the sag value of the 3D shape of the defocus region b is a value obtained by increasing the sag value of the 3D shape of the defocus region a." in 80% or more of all defocus regions. This means that not only the defocus region b but also the defocus region c, d, e, . . . satisfying the above relationship exist (all of them have larger sag values than the defocus region a, and an amount of increase in the sag value is different from that of the defocus region b.).

The diameter of the defocus region in plan view is preferably about 0.6 to 2.0 mm. The sag amount (protruding height, protruding amount) of the defocus region is approximately 0.1 to 10 μm, preferably 0.4 to 2.0 μm. The radius of curvature of a convex region is 50 to 250 mm, preferably approximately 86 mm.

A defocus power brought from the defocus region on the spectacle lens preferably has a minimum value in a range of 0.50 to 4.50 D and a maximum value in a range of 3.00 to 10.00 D. A difference between the maximum and minimum values is preferably within a range of 1.00 to 5.00 D.

The film thickness of a coating film provided on the lens substrate may be, for example, in a range of 0.1 to 100 μm (preferably 0.5 to 5.0 μm, more preferably 1.0 to 3.0 μm).

Also provided is a design system of a spectacle lens including:

a base region where a light flux incident from an object-side surface is emitted from an eyeball-side surface and converges on a retina through an eyeball; and a plurality of defocus regions surrounded by the base region and having a property that the light flux passing through at least a part of the defocus region is incident on the retina as a divergent light; the design system including:

a calculation unit that changes a focus position for a wearer, depending on a position of the defocus region on a spectacle lens, by increasing a sag value of a 3D shape of the defocus region so that the defocus region uplifts with respect to a base surface: or decreasing the sag value of the 3D shape of the defocus region so that the defocus region sinks with respect to the base surface, wherein a direction toward outside of a lens, which is a normal direction on a base surface, is shown by a positive sag value, and a direction toward inside of the lens, which is a normal direction on the base surface, is shown by a negative sag value, with the base surface of the base region as a reference.

Also provided is a design program of a spectacle lens including a base region where a light flux incident from an object-side surface is emitted from an eyeball side surface and converges on a retina through an eyeball; and a plurality of defocus regions surrounded by the base region and having a property that a light flux passing through at least a part of the defocus region is incident on the retina as a divergent light, the design program causing a computer device to function as a calculation unit that changes a focus position for a wearer, according to a position of the defocus region on a spectacle lens, by increasing a sag value of a 3D shape of the defocus region so that the defocus region uplifts with respect to the base surface; or decreasing the sag value of the 3D shape of the defocus region so that the defocus region sinks with respect to the base surface, wherein a direction toward outside of a lens, which is a normal direction on a base surface, is shown by a positive sag value, and a direction toward inside of the lens, which is a normal direction on the base surface, is shown by a negative sag value, with the base surface of the base region as a reference.

Advantage of the Disclosure

According to an embodiment of the present disclosure, there is provided a technique of flexibly changing a focus position that a defocus region brings to a wearer, depending on a position on a spectacle lens, and particularly there is provided a technique of flexibly changing the focus position while the surface shapes of the defocus regions are equal to each other.

BRIEF DESCRIPTION OF THE DRAWINGS

FIGS. 1A-1C are schematic (X-Z) cross-sectional views showing a state in which a sag value of a 3D shape of a defocus region (FIG. 1A) is increased so that the defocus region is uplifted with respect to a base surface, thereby setting another 3D shape of the defocus region (FIG. 1B). FIG. 1C is an explanatory cross-sectional view when alignment is performed on a base surface at the center of both 3D shapes in plan view so as to show a difference in the sag values of both 3D shapes.

FIGS. 2A-2C are schematic (X-Z) cross-sectional views in which the sag value of the 3D shape of the defocus region (FIG. 2A) is decreased so that the defocus region sinks with respect to the base surface, thereby setting another 3D shape of the defocus region (FIG. 2B). FIG. 2C is an explanatory cross-sectional view when alignment is performed on a base surface at the center of both 3D shapes in plan view so as to show a difference in the sag values of both 3D shapes.

FIG. 3A is a graph in which the vertical axis represents VSOTF (Visual Strehl ratio based on OTF), and the horizontal axis represents a defocus amount (unit: D (diopter), zero represents a retina position), when the defocus region has a spherical shape with a diameter of 1 mm and the refractive index of the spectacle lens is 1.59. FIG. 3B is an enlarged view of FIG. 3A.

FIG. 4A is a graph in which the vertical axis represents VSOTF (Visual Strehl ratio based on OTF), and the horizontal axis represents the defocus amount (unit: D (diopter), zero is the retina position), when the defocus region has a spherical shape with a diameter of 1 mm and a refractive power of 4.00 D, and the refractive index of the spectacle lens is 1.59. FIG. 4B is an enlarged view of FIG. 4A.

DETAILED DESCRIPTION OF THE DISCLOSURE

Figure 5:
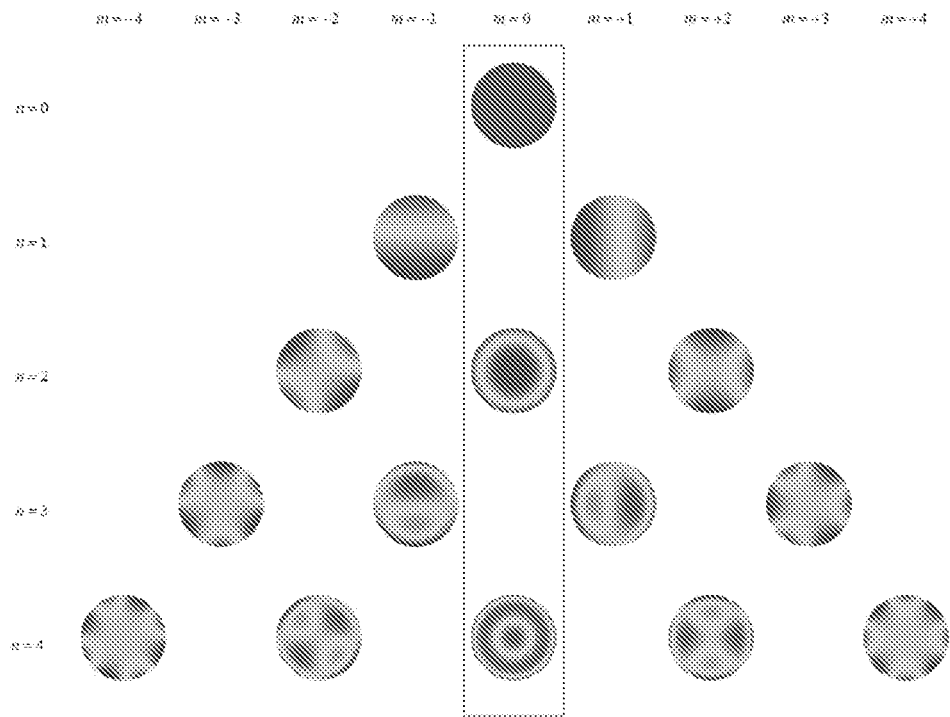
FIG. 5 is an explanatory view showing a specific example of a shape decomposition based on Zernike polynomials.

Embodiments of the present disclosure will be described below. The following description based on the drawings is an example, and the present disclosure is not limited to the exemplified embodiments. Contents not described in this specification are all described in Patent document 1, and the description of WO2020/004551 is all described for the contents (particularly the contents related to the manufacturing method) not described in Patent document 1. If there is a discrepancy between the description of Patent document 1 and the description of the publication, the description of the publication takes precedence.

The spectacle lens described herein has an object-side surface and an eyeball-side surface. The "object-side surface" means a surface located on the object-side when a spectacle with a spectacle lens is worn by a wearer, and the "eyeball-side surface" is the opposite, ie the surface that is located on the eyeball-side when the spectacle with the spectacle lens is worn by the wearer. This relationship also applies to a lens substrate serving as a basis of the spectacle lens. That is, the lens substrate also has an object-side surface and an eyeball-side surface.

In this specification, the horizontal direction is the X direction, the vertical (vertical) direction is the Y direction, and the thickness direction of the spectacle lens and perpendicular to the X and Y directions is the Z direction, in a state where the spectacle lens is worn. When facing the wearer, the right side is the +X direction, the left side is the −X direction, the upper side is the +Y direction, the lower side is the −Y direction, the object-side direction is the +Z direction, and the opposite direction (back side direction) is the −Z direction.

In this specification, " . . . to . . . " indicates a predetermined value or more and a predetermined value or less. Reference numerals will be given hereafter, but only the first appearance items will be given reference numerals, and the rest will be omitted.

<Spectacle Lens>

A spectacle lens according to one aspect of the present disclosure includes: a base region where a light flux incident from the object-side surface is emitted from the eyeball-side surface and converges on a retina through an eyeball; and a plurality of defocus regions surrounded by the base region and having a property that the light flux passing through at least a part of the defocus region is incident on the retina as a divergent light.

The base region is a portion having a shape capable of achieving a prescribed refractive power given to a wearer from a viewpoint of geometric optics, and corresponds to a first refractive region of Patent document 1.

The defocus regions are the regions in which at least a part of the region does not allow light to be converged to a condensing position of the base region from the viewpoint of geometrical optics. The defocus regions are the portions corresponding to the minute projections of Patent document 1. The spectacle lens according to one aspect of the present disclosure is a myopia progression suppressing lens, like the spectacle lens described in Patent document 1. Like the minute projections of Patent document 1, a plurality of defocus regions according to one aspect of the present disclosure may be formed on at least one of the object-side surface and the eyeball-side surface of the spectacle lens. This specification mainly shows a case where a plurality of defocus regions are provided only on the object-side surface of the spectacle lens. Hereinafter, unless otherwise specified, this specification shows a case where the defocus region has a curved surface shape protruding toward outside of the lens.

Figure 10:
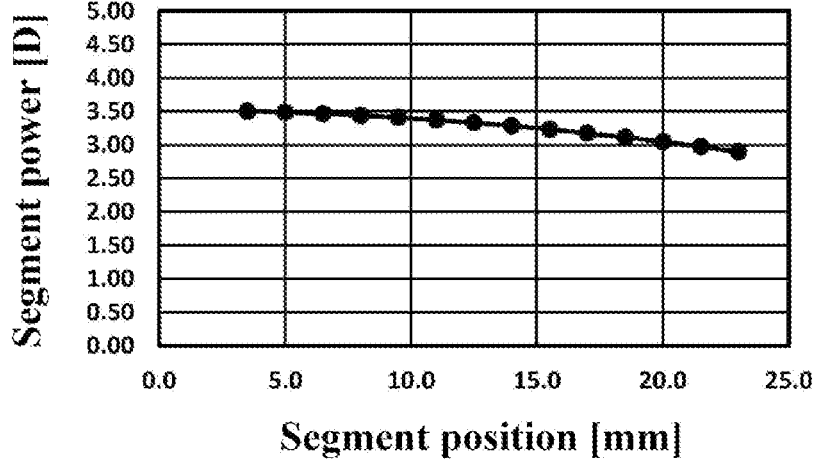
FIG. 10 is a graph of example 1B, in which the vertical axis represents the segment power (unit: D) and the horizontal axis represents the position of the center of the defocus region in plan view (the origin is the center of the lens) (unit: mm).

As shown in FIG. 10 of Patent document 1, the defocus region may be formed in the center portion of the spectacle lens, or as shown in FIGS. 1A-1C of Patent document 1, the defocus region may not be formed in the center portion of the spectacle lens. One aspect of the present disclosure shows a case where no defocus region is formed in the center portion of the spectacle lens.

The "center portion of the spectacle lens" refers to the vicinity of the center of the lens. This specification shows a case of a centering center and the vicinity thereof. The centering center is also called a lens center. This specification shows a case that the lens center is a place where line of sight passes through in front view of a wearer.

The defocus region in the spectacle lens of one aspect of the present disclosure includes a defocus region a provided at a predetermined position A and a defocus region b provided at a predetermined position B on the spectacle lens.

A direction toward outside of a lens, which is a normal direction on a base surface, is shown by a positive sag value, and a direction toward inside of the lens, which is a normal direction on the base surface, is shown by a negative sag value, with the base surface of the base region as a reference Strictly speaking, the normal direction on the base surface differs in each defocus region, but the difference is slight. Therefore, in this specification, the normal direction is treated as the Z direction. That is, the direction toward the outside of the lens is treated as the +Z direction (the direction from the eyeball-side surface toward the object-side surface in this example), and the direction toward the inside of the lens (the opposite direction in this example) is treated as the −Z direction. In this specification, a planar view is a view when viewed from the +Z direction to the −Z direction.

The "base surface" is one main surface of the spectacle lens (the object-side surface in this example) when it is assumed that there is no defocus region.

The sag value of the 3D shape of the defocus region b of the spectacle lens according to one aspect of the present disclosure is a value obtained by increasing the sag value of the 3D shape of the defocus region a (uplift, raising). In other words, the sag value of the 3D shape of the defocus region a is a value obtained by decreasing the sag value of the 3D shape of the defocus region b (sinking, digging).

FIGS. 1A-1C are schematic (X-Z) cross-sectional views showing a state in which the sag value of the 3D shape of the defocus region (FIG. 1A) is increased so that the defocus region is uplifted with respect to the base surface, thereby setting another 3D shape of the defocus region (FIG. 1B). FIG. 1C is an explanatory cross-sectional view when both 3D shapes are aligned on the base surface at the centers of both 3D shapes in plan view so as to show a difference in the sag values of both 3D shapes. A solid line indicates the 3D shape of the portion where the sag value is increased. A dashed line indicates a base portion 3 newly formed as a result of uplifting of the defocus region 2 with respect to the base surface Is of the base region 1. A long dashed line in FIG. 1C indicates the 3D shape of the defocus region in FIG. 1A, and a solid line in FIG. 1C indicates the 3D shape of the defocus region in FIG. 1B.

FIGS. 2A-2C are schematic (X-Z) cross-sectional views in which the sag value of the 3D shape of the defocus region (FIG. 2A) is decreased so that the defocus region sinks with respect to the base surface, thereby setting another 3D shape of the defocus region (FIG. 2B). FIG. 2C is an explanatory cross-sectional view when both 3D shapes are aligned on a base surface at the centers of both 3D shapes in plan view so as to show a difference in the sag values of both 3D shapes. A dotted line indicates the base surface. A dashed line indicates a concave portion 4 newly formed between the base region and the defocus region as a result of sinking of the defocus region. A long dashed line in FIG. 2C indicates the 3D shape of the defocus region in FIG. 2B, and a solid line in FIG. 2C indicates the 3D shape of the defocus region in FIG. 2A.

The above description of FIGS. 2A-2C relate to a transition from (a) to (b). On the other hand, a change from (b) to (a) is also allowed. In this case, it can be said that the sag value of the 3D shape of the defocus region in (b) is increased so that the defocus region is uplifted with respect to the base surface, thereby setting another 3D shape of the defocus region.

In this specification, "the sag value of the 3D shape of the defocus region b is a value obtained by increasing the sag value of the 3D shape of the defocus region a" means that the 3D shape of the defocus region a before increasing the sag value is displaced in the +Z direction, as shown in FIGS. 1C and 2C.

For example, the sag value at point b1 (eg, vertex of the convex region) in the defocus region b is positively larger than the sag value at point a1 (eg, vertex of the convex region) in the defocus region a. Further, both sag values may be positive. However, the sag value may be zero on a boundary with the base region. Therefore, the 3D shape referred to here is the shape inside the boundary with the base region.

When adopting the vertex of the convex region, the above relationship between the sag values may be maintained over an entire center point including the vertex of the convex region (FIGS. 1C and 2C). In some cases, a similar relationship between the sag values (FIG. 2C) may be maintained on an outer edge of the convex region. The above relationship between the sag values may be maintained at the center (or center of gravity) in plan view instead of the vertex of the convex region.

In other words, the relationship between the sag values can be expressed as follows. As shown in FIGS. 1C and 2C, when it is assumed that the 3D shape of the defocus region a and the 3D shape of the defocus region b are aligned and superimposed at the center (or center of gravity) in plan view and on the base surface, the 3D shape of the defocus region b exists in the +Z direction when viewed from the 3D shape of the defocus region a. In the above assumption (FIGS. 1C and 2C), even in the case of contacting the 3D shape of the defocus region b (for example, in the case where the outermost edges of the defocus regions contact each other), the 3D shape of the defocus region a does not protrude from the 3D shape. Preferably, both shapes do not contact each other when it is assumed that both 3D shapes are superimposed on each other as described above.

The relationship between the sag values may be satisfied on the lens substrate having the defocus regions a and b therein. The relationship between the sag values may also be satisfied in the case of forming a hard coat film on the lens substrate, or may be satisfied in the case of forming the hard coat film on an antireflection film. When forming the hard coat film, the defocus regions a and b may be realized even on the lens substrate not having the defocus regions a and b therein. That is, the defocus regions a and b may be realized by the hard coat film.

In one aspect of the present disclosure, as shown in FIGS. 1A-1C and 2A-2C, the sag value with respect to the base surface is varied according to the position of each defocus region on the spectacle lens. Thereby, the focus position that the defocus area brings to the wearer can be flexibly changed according to the position on the spectacle lens. When viewed from another aspect, one aspect of the present disclosure allows control of the best wave optics contrast position. The reason for this will be described in detail below.

FIG. 3A is a graph in which the vertical axis represents VSOTF (Visual Strehl ratio based on OTF), and the horizontal axis represents a defocus amount (unit: D (diopter), zero indicates a retina position), when the defocus region has a spherical shape with a diameter of 1 mm and the refractive index of the spectacle lens is 1.59.

FIG. 3B is an enlarged view of FIG. 3A.

A dashed line indicates a plot when the refractive power of the defocus region is 3.50 D. A solid line indicates a plot when the refractive power of the defocus region is 4.00 D. A dotted line indicates a plot when the refractive power of the defocus region is 4.50 D. For settings other than the diameter of the defocus region and the refractive index of the spectacle lens, the description of example 1 below is adopted.

FIG. 4A is a graph in which the vertical axis represents VSOTF (Visual Strehl ratio based on OTF) and the horizontal axis represents the defocus amount (unit: D (diopter), zero indicates a retina position) when the defocus region has a spherical shape with a diameter of 1 mm, the refractive power is 4.00 D, and the refractive index of the spectacle lens is 1.59.

FIG. 4B is an enlarged view of FIG. 4A.

The solid line represents a plot when the refractive power of the defocus region is 4.00 D, which is the same as the plot shown in FIG. 3A. The dashed line indicates a plot when the defocus region indicated by the solid line sinks by 0.23 μm (eg FIGS. 2A-2C). The dotted line indicates a plot when the defocus region indicated by the solid line uplifts by 0.23 μm (eg, FIGS. 1A-1C).

VSOTF is a scalar quantity in consideration of the contrast sensitivity characteristics that are considered to be due to a retinal structure or a nervous system. VSOTF is the sum of the real parts of OTFs weighted in consideration of the sensitivity characteristics for each spatial frequency of an eye. Specific formulas are as follows.

Numerator OTF: OTF (Optical Transfer Function) in a real lens.

Denominator OTFDL: OTF when the lens is assumed to have no aberrations.

CSF: Contrast Sensitivity Function with respect to spatial frequency of human vision. CSF has a sensitivity peak at low frequency sufficiently low with respect to cutoff frequency.

VSOTF is described in the following document "Thibos L N, Hong X, Bradley A, Applegate R A. Accuracy and precision of objective refraction from wavefront aberrations. J Vis. 2004 Apr. 23:4(4): 329-51." Therefore, the description here is omitted.

The OTF is one of the scales for evaluating a lens performance, and expresses how faithfully the contrast of an object to be viewed can be reproduced on an image plane as a spatial frequency characteristic. A large MTF (Modulation Transfer Function) value, which is the absolute value of OTF, means that a wearer perceives a high contrast when viewing an object through a lens.

As shown in FIG. 3B, apart from the light flux condensed on the retina (zero value on the horizontal axis) by the base region, the light flux converges in front of the retina and incidents on the retina as a divergent light. Then, the defocus amount at that time differs depending on the refractive power in the defocus region.

Then, as shown in FIG. 4B, it is found by the present inventors that with uplift of the defocus region, the same situation can be reproduced as when increasing the refractive power in the defocus region. It is also found by the present inventors that with sinking of the defocus region, the same situation can be reproduced as when the refractive power in the defocus region is decreased.

In consideration that the vertical axis represents VSOTF, and by utilizing the above finding, there is provided a technique of flexibly changing a focus position that a defocus region brings to a wearer, depending on a position on a spectacle lens. In the future, this finding will lead to a possibility of providing the best focus position to the wearer of the spectacle lens including the defocus region, according to the position of the defocus region. This principle will be explained below using an example. The following example shows, for example, a case where a plurality of spherical defocus regions, which are convex regions protruding in the +Z direction, are provided on the object-side surface.

First, the wavefront of the spectacle lens and the Zernike polynomials may be used to calculate the focus position based on VSOTF.

The wavefront of the spectacle lens refers to the wavefront of a light flux that passes through the spectacle lens and whose diameter is defined by a pupil. There is no particular limitation in the method used to specify the amount of travel w of the wavefront in each defocus region, with respect to the base region. The amount of travel w of the wavefront can be specified, for example, by simulation processing using a wave optics calculation.

Zernike polynomials are functions (orthogonal polynomials) defined inside a unit circle with a radius of 1. Specifically, it is represented by the following formula (1).

[Formula 1]

$$VSOTF = \frac{\int_{-\infty}^{+\infty}\int_{-\infty}^{+\infty} CSF(r, s) \cdot \mathrm{Re}[OTF(r, s)]drds}{\int_{-\infty}^{+\infty}\int_{-\infty}^{+\infty} CSF(r, s) \cdot OTF_{DL}(r, s)drds}$$

[Formula 2]

$$W(x, y) = \sum_{j=1}^{J} c_j Z_j(x, y) \tag{1}$$

In the formula (1), W(x, y) is the wavefront at coordinates x, y, Zj(x, y) is the j-th Zernike polynomial, cj is the Zernike coefficient corresponding to the j-th Zernike polynomial, and J is the number of Zernike polynomials used for expansion.

According to such Zernike polynomials, all surface shapes can be (approximately) expressed by the sum of the Zernike polynomials.

FIG. 5 is an explanatory view showing a specific example of a shape decomposition using Zernike polynomials.

Specifically, for example, as shown in FIG. 5, for a certain surface shape, shape decomposition is carried out from 0-th order aberration to n-th (n is a natural number) order aberration, using the Zernike polynomials In the figure, each component surrounded by a frame near the center indicates a rotationally symmetric component, and each component other than the rotationally symmetric component indicates a non-rotationally symmetric component. Further, in the figure, a secondary aberration component belonging to the rotationally symmetric component is generally called a power error (defocus), and the coefficient of the aberration corresponds to the focus position where the wavefront aberration is minimized. A fourth-order aberration component belonging to the rotationally symmetric component is a component corresponding to spherical aberration. The sum of the coefficients of each component belonging to the rotationally symmetric component corresponds to the focus position where PSF (Point Spread Function) is minimized. PSF may be obtained by a ray tracing method.

Further, for example, as for the expansion coefficient in the above polynomials or orthogonal polynomials, each weighting of the rotationally symmetric component (see FIG. 5) may be 1 when expanded by the Zernike polynomials. When each weighting of the rotationally symmetric components is 1, the focus position where PSF is minimized, can be calculated. However, weights for components that do not have significant quantities may be omitted.

It can be explained below that the focus position can be calculated from the expansion coefficient of the Zernike polynomials. When assuming that a light flux is incident on a surface of a gentle curved spectacle lens having a refractive index of N at an angle $\alpha$ and exits at an angle $\alpha'$, the following proportional relationship is established between the sag value Z and the wavefront aberration W, the sag value Z being the amount of displacement from the base surface and representing the lens shape.

$$W(h_x, h_y) = (\cos\alpha - N\cos\alpha')Z(x, y) \qquad \text{[Formula 3]}$$

hx, hy are the pupil heights of light rays normalized to ±1. x, y are the coordinates on the lens corresponding to the setting of hx, hy. When assuming that the diameter of the defocus region (here, the diameter in plan view) is $\varphi$, the following formula is established. The wavefront and the sag value Z of the 3D shape of the defocus region are in a proportional correspondence relationship.

$$h_x = \frac{2x}{\phi} h_y = \frac{2x}{\phi} \qquad \text{[Formula 4]}$$

The light aberrations (lateral aberrations) Dx and Dy at a distance 1 from the lens can be expressed by the product of the differentiation of the wavefront aberration W with respect to h and the F value of the defocus region (when one defocus region is regarded as a lens), as shown in the following formula.

$$D_x = \left(\frac{2l}{\phi}\right)^2 \times \frac{\partial W}{\partial h_x} D_y = \left(\frac{2l}{\phi}\right)^2 \times \frac{\partial W}{\partial h_y} \qquad \text{[Formula 5]}$$

Generally, various definitions of the focus position are used depending on a concept and application such as a position where the contrast of a target spatial frequency is highest, a position where energy is highest, and a position where the dispersion of light rays is smallest. The position where the energy is highest is equivalent to "the position where the sum of the contrasts of all spatial frequencies is highest", and the position where the dispersion of light rays is smallest (specifically, the position where the PSF is the smallest) is equivalent to "the position where the contrast of low spatial frequencies infinitely close to zero is highest".

In spectacles, in consideration of the fact that the peak of the sensitivity characteristics of an eye is sufficiently close to low frequencies, it is appropriate to determine the focus position by emphasizing the contrast at low frequencies. An intermediate position is the focus position, which is the position between the position where an energy is highest and the position where the dispersion of light rays is smallest.

The position where the energy is highest corresponds to a so-called focal length obtained from the curvature of the wavefront. The position where the dispersion of light rays is smallest can be calculated as the focus position from the amount of light aberration as follows.

The focus position is a state where all the aberrations due to defocus amount included in the light aberration are removed, that is, the position where the residual aberration is minimum after removing the defocus aberration. This is represented by a formula. The dispersion of PSF, which is a function representing the position of the light ray on a certain image plane, is the sum of squares of lateral aberrations as shown in the following formula.

$$V = \int_{-1}^{1} \int_{-\sqrt{1-y^2}}^{\sqrt{1-y^2}} \{D_x(h_x, h_y)^2 + D_y(h_x, h_y)^2\} dh_x dh_y \qquad \text{[Formula 6]}$$

The light aberration due to defocus amount P is a linear function of (hx, hy). Therefore, the position where the dispersion of PSF is minimum is the position where the residual is minimum when approximating the aberration with a linear function in the amount of light aberration. That is, the position shifted by the defocus amount from the image plane becomes the focus position. The following formula shows this situation.

$$V_{focus} = \int_{-1}^{1} \int_{-\sqrt{1-y^2}}^{\sqrt{1-y^2}} \{(D_x(h_x, h_y) - Ph_x)^2 + (D_y(h_x, h_y) - Ph_y)^2\} dh_x dh_y \to \min \qquad \text{[Formula 7]}$$

The above formula is solved as follows.

$$P = \int_{-1}^{1} \int_{-\sqrt{1-y^2}}^{\sqrt{1-y^2}} \{h_x D_x(h_x, h_y) + h_y D_y(h_x, h_y)\} dh_x dh_y \qquad \text{[Formula 8]}$$

Here, the relationship between the wavefront aberration and light aberration is utilized, and this relationship is obtained as follows based on the above [Formula 5].

$$(h_x W)' = \left(\frac{2l}{\phi}\right)^2 (W + h_x D_x) \qquad \text{[Formula 9]}$$

When the above formula is partially integrated and expressed in polar coordinates, the following formula is obtained. The defocus region is treated as a closed section where r<1, and the circumference where r=1 is treated as a base region.

$$P \propto \left(\frac{2}{\phi}\right)^2 \left(\frac{\int_0^{2\pi}\int_0^1 W(r,\theta)drd\theta}{\pi} - \frac{\int_0^{2\pi} W(1,\theta)d\theta}{2\pi}\right) \qquad \text{[Formula 10]}$$

The value in the first parenthesis on the right side is the reciprocal of the square of the radius ($\phi/2$) of the defocus region in plan view, so this value is the reciprocal of a bottom area.

The first term in the second parentheses on the right side is the integrated value of the wavefront aberration in an entire defocus region. The wavefront aberration corresponds to the amount of the lens sag, so this term corresponds to the integral of the amount of the lens sag, i.e., the volume.

The defocus region is defined as a closed section satisfying r<1, so the height of the second term in the second parenthesis on the right side is an average height of the base surface surrounding the defocus region.

In summary, the second parenthesis on the right side indicates the volume of a hatched portion in FIGS. 1A-1C or the volume of a hatched portion in FIGS. 2A-2C. In the case of FIGS. 1A-1C, the second parenthesis on the right side indicates the volume of an entire hatched portion j because all the sag values of the 3D shape of the defocus region are positive. In the case of FIGS. 2A-2C, the second parenthesis on the right side indicates a value obtained by subtracting the volume of a hatched portion k below the base surface, from the volume of the portion above the base surface (hatched portion j) in the defocus region.

That is, the defocus amount P, which leads to the focus position, correspond to a value obtained by dividing the integrated value of the sag value with the height of the base surface as a reference, by the bottom area of the defocus region, the base surface (hereinafter also simply referred to as "outermost periphery") being adjacent to the defocus region in plan view and surrounding the defocus region.

In more detail: the focus position is proportional to a value obtained in such a way that a volume (integrated value) of a portion between the defocus region and the base surface and having a negative sag value is subtracted from a volume (integrated value) of a portion between the defocus region and the base surface and having a positive sag value, and a value thus obtained is divided by a bottom area of the defocus region.

Then, the sum of the rotationally symmetric components of the Zernike polynomials is the integrated value of the progress of the wavefront with the outermost periphery of the defocus region as a reference, which corresponds to the integrated value of the sag value with the outermost periphery of the defocus region as a reference.

As a result, by increasing or decreasing the sag value of the defocus region, the focus position can be controlled by uplifting or sinking (in other words, raising, digging) of the defocus region.

By the way, in the case of a spectacle lens, it was explained that the peak of the sensitivity characteristics of an eye is sufficiently close to low frequencies, and also was explained that it is appropriate to determine the focus position by emphasizing the contrast at low frequencies.

For example, in the middle frequency, which is an average of all frequencies, the focus position by MTF is generally determined by the radius of curvature R of the defocus region. On the other hand, at low frequencies very close to zero, the focus position by MTF is generally determined by the integrated value of the sag value Z with the outermost periphery of the defocus region as a reference. As a result, the focus position in the frequency characteristics of an eye (total of low to medium frequencies) is determined by the radius of curvature R and the integrated value of the sag value Z.

For example, a position closer to the retina when a distance between the geometric focal point (Geometric Focal) determined by the radius of curvature R of the defocus region and a focal point (best focus position at low frequencies) determined by the integral value of the sag value Z of the defocus region is divided into four equal parts, is given as a focus position for an eye. Such a focus position is expressed by the following formula.

((distance from retina to middle frequency focus position)×3+(distance from retina to low frequency focus position))/4=(focus position for eye and distance from retina)

The power of the defocus region that brings this focus position is also called a segment power.

If the bottom area of each defocus region is equal, focus control of the defocus region for the wearer is enabled simply by increasing or decreasing the sag value of the defocus region and displacing each defocus region up or down. This "equal" means that the bottom area of each defocus region has an error of 10% or less (preferably 5% or less, 3% or less, or 1% or less) from the average value of the bottom area of each defocus region.

Thereby, the focus position can be changed without changing the surface shape of the defocus region according to the position on the spectacle lens. Compared to changing the surface shape in accordance with the change of the focus position, manufacturing becomes facilitated. For example, a null (NULL) wavefront, etc., can be created together at the time of interference measurement.

The "bottom area" in this specification is the area of the portion surrounded by the outermost periphery of the defocus region. When the sag value of the outermost periphery is positive, the area of the region superimposing on the base surface is taken as the bottom area. When the sag value of the outermost periphery is negative, the area of the portion surrounded by the most negative sag value is taken as the bottom area. The area of the defocus region (or convex region) in plan view may be adopted as the bottom area.

It has been described that the defocus power to be given to the wearer varies depending on the wearer or the position of the lens. This means that the sag value of the defocus region is increased or decreased depending on the position of the defocus region on the spectacle lens. An example of this concept and application is listed below.

(Power Error: Predetermined Position B where the Sag Value is Relatively High is a Position Near the Center of the Lens)

Astigmatism and power error occur due to oblique incidence because the portion away from the lens center (portion near the lens periphery, lens peripheral portion) is used for peripheral vision. Therefore, the defocus power given to the wearer by the light flux incident and emitted on/from the center of the lens is different from the defocus power given to the wearer by the light flux incident and emitted on/from the portion near the periphery of the lens.

In order to make up for this difference, the predetermined position B may be positioned closer to the center of the lens, and the predetermined position A may be positioned closer to the periphery of the lens. That is, by setting a high sag value of the defocus region near the center of the lens and a low sag value of the defocus region near the periphery of the lens, the power increase associated with power error may be canceled. At this time, as shown in FIG. 2B, the sag value near the base region may be negative in the 3D shape of the defocus region a at the predetermined position A. Of course, as shown in FIG. 1B, the sag value of the entire 3D shape of the defocus region a may be positive.

(Consideration for Curvature of Field and Curvature of Retina in Ocular Optical System at Peripheral Portion of Retina Away from Foveal Portion)

Another example of the difference in defocus power due to the difference in position on the spectacle lens is as follows.

An eyeball optical system has a curvature of field based on Petzval's law, but the curvature of retina has a further stronger curvature. Therefore, generally, a light flux condensing position is on the back side of the retina in the peripheral portion of the retina. Particularly, myopic people tend to have a stronger curvature of the retina, with a deeper condensing position, due to elongation of an axial length of the eye.

In view of this matter, based on information such as a measured retinal shape, axial length, and degree of the progression of myopia, etc., it is suggested that a spectacle with a high peripheral defocus power should be prescribed for a wearer whose retinal curvature is estimated to be high.

To achieve this, the predetermined position A may be positioned closer to the center of the lens, and the predetermined position B may be positioned closer to the periphery of the lens. That is, the sag value of the defocus region closer to the periphery of the lens may be set to be high, and the sag value of the defocus region closer to the center of the lens may be set to be low, to correspond to the curvature of the peripheral portion of the retina. At this time, the sag value near the base region may be negative in the 3D shape of the defocus region a at the predetermined position A.

(Regarding the Above Consideration for Curvature, the Case where the Nose-Side Periphery and Ear-Side Periphery of the Lens are Asymmetrical)

It is known that the curvature of field and the curvature of retina of an eye are asymmetrical between the nose-side and the ear-side, and there are individual differences in its degree. Accordingly, it is preferable to make the defocus power asymmetrical between the ear-side and nose-side values depending on a wearer.

Further, in a so-called high-curve lens that is curved along the shape of a face, an incident angle differs between the ear-side and the nose-side. In this case also, the defocus power is required to be set asymmetrically in accordance with the asymmetric incident angles on the ear-side and the nose-side.

At this time, in consideration of the asymmetry between the nose-side and the ear-side, the degree of increase in the sag value may differ depending on whether it is closer to the nose-side periphery or the ear-side periphery. The predetermined position A may be the nose-side position, and the predetermined position B may be the ear-side position. Conversely, the predetermined position A may be the ear-side position, and the predetermined position B may be the nose-side position. At this time, the sag value near the base region may be negative in the 3D shape of the defocus region a at the predetermined position A.

<Preferable Examples and Modified Examples of a Spectacle Lens>

Preferable examples and modified examples of a spectacle lens according to one aspect of the present disclosure will be described below.

The sag value of the entire 3D shape of the defocus region a at the predetermined position A and the sag value of the entire 3D shape of the defocus region b at the predetermined position may both be positive or negative.

When assuming that the predetermined position B is closer to the periphery of the lens and the predetermined position A is closer to the center of the lens and both sag values are positive, the defocus region b has a shape of uplifting the defocus region a (for example, FIGS. 1A-1C). Therefore, the volume of the convex region including the defocus region b is larger than the volume of the convex region including the defocus region a. Further, the sag value at the center point of the 3D shape of the defocus region b may be equal to a value obtained by increasing the sag value at the center point (in some cases, the whole) of the 3D shape of the defocus region a by a predetermined value. The shape of a base portion caused by uplifting may be appropriately set so as to connect with the base region.

When assuming that the predetermined position B is closer to the periphery of the lens and the predetermined position A is closer to the center of the lens, the defocus region a at the predetermined position A may have a value obtained by decreasing the sag value of the 3D shape of a defocus region m (sinking, digging), while the defocus region b at the predetermined position B may have a value obtained by increasing the sag value at the center point of the 3D shape of the defocus region m (uplifting, raising), with the 3D shape of the defocus region m at the intermediate position M as a reference.

Figures 6A, 6B:
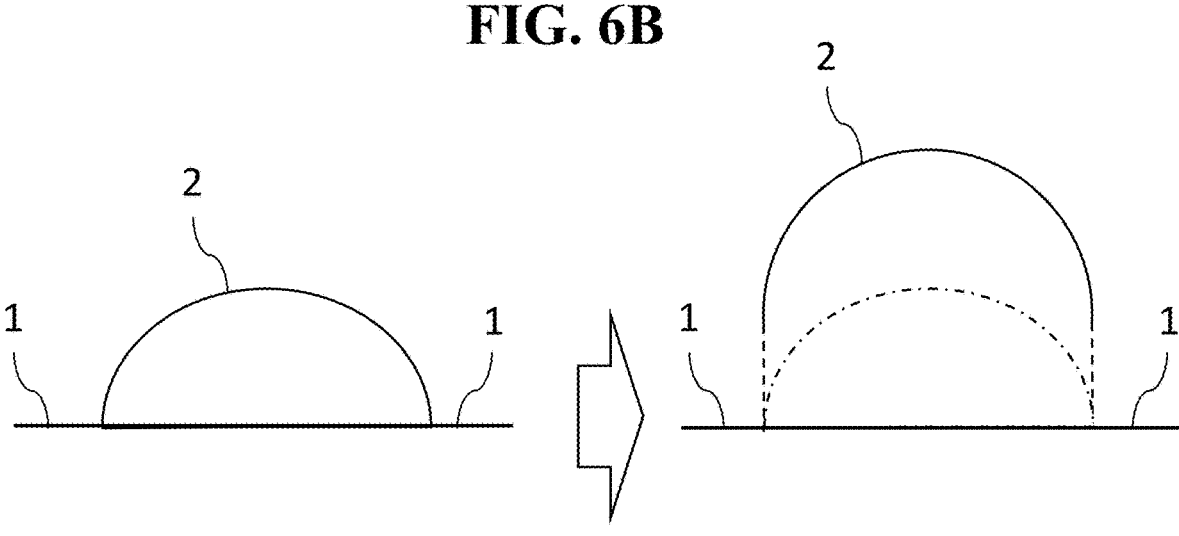
FIG. 6A is a schematic cross-sectional view when the amount of increase in the sag value of the 3D shape increases from the center point toward the periphery.
FIG. 6B is a schematic cross-sectional view when the amount of increase in the sag value of the 3D shape decreases from the center point toward the periphery.

FIG. 6A is a schematic cross-sectional view when the amount of increase in the sag value of the 3D shape increases from the center point toward the periphery, and FIG. 6B is a schematic cross-sectional view when the amount of increase in the sag value of the 3D shape decreases from the center point toward the periphery. A dashed-dotted line indicates the 3D shape of the defocus region before increasing the sag value.

As shown in FIGS. 1A-1C, the amount of increase in the sag value of the 3D shape may be constant, or may be changed according to the location of the 3D shape as shown in FIGS. 6A and 6B.

In the case of FIGS. 1A-1C, the surface shapes of the defocus regions a and b are equal at least at the center point. This "equal" means that the error from the average value of the sag value of the 3D shape of each defocus region ((sag value at point a1+sag value at point b1)/2) is 10% or less (preferably 5%3% or less, 1% or less), at any point in each defocus region (e.g., point a1 in the defocus region a (e.g., vertex of the convex region), and point b1 in the defocus region b and corresponding to point a1 (e.g., vertex of the convex region))

In FIGS. 1A-1C and FIGS. 6A and 6B, the sag value at point b1 exceeds the sag value at point a1. Examples of the location include at least one (preferably both) of the vertex of the convex region and the outer edge of the convex region.

The radius of curvature at the center point (entirely in some cases) of the defocus region a and the radius of curvature at the center point (entirely in some cases) of the defocus region b may be equal. In this case, the focus position can be flexibly changed while the surface shapes of the defocus regions are equal to each other.

In this specification, the term "the radius of curvature may be equal" means that the error from the average value of the radius of curvature at the center point of each defocus region is 10% or less (preferably 5% or less, 3% or less, or 1% or less). Equal radius of curvature of each defocus region means that the center point (an entire defocus region in some cases) has the same shape although the sag value (height) is different. Thereby, design and manufacturing (for example, formation of a defocus region using inkjet, etc) is facilitated.

When the center point of the defocus region has an aspheric shape, the aspheric coefficients may be equal in addition to equalizing both radii of curvature. In this specification, the term "equal aspherical coefficients" means that the error from the average value of the aspherical coefficients at the center point of each defocus region is 10% or less (preferably 5% or less, 3% or less, or 1% or less).

When the center point of the defocus region has an aspherical shape, an approximate radius of curvature may be used. The approximate radius of curvature R is expressed by the following formula, where C is the diameter of a circle forming the outer edge in plan view, and h is the sag value from the outer edge.

$$R = \{h^2 + (C/2)^2\}/2h$$

A substantially circular defocus region may be arranged around the center portion of the spectacle lens, in an island shape (that is, separated from each other without being adjacent to each other) at equal intervals in circumferential and radial directions. As an example of the arrangement of the defocus regions in plan view, there is an example in which the defocus regions are arranged independently and discretely so that the center of each defocus region becomes the vertex of an equilateral triangle (the center of each defocus region is placed at the vertex of a honeycomb structure). This arrangement is also called a "hexagonal arrangement". This specification focuses on this example.

More than half of the plurality of defocus regions (all defocus regions) are preferably arranged in the same cycle in plan view. A hexagonal arrangement is given as an example of patterns with the same cycle. The direction of the cycle may be circumferential and/or radial. The number of the defocus regions is preferably 80% or higher, more preferably 90% or higher, even more preferably 95% or higher. Hereinafter, "the number of half or more of all defocus regions (or the number of 80% or more)" means, preferably, 80% or more, 90% or more, and 95% or more in an order of preference, and repetitive description is omitted.

In the defocus region T that is a gathering T of the defocus regions with the number of 80% or more of all defocus regions, including the defocus region a and the defocus region b, it is preferable that the radius of curvature at each center point is equal, and the number of defocus regions having the same sag value as the defocus region a is 10 to 90%, and the number of defocus regions having the same sag value as the defocus region b is 10 to 90%. That is, it is preferable to secure a considerable number of defocus regions a and defocus regions b.

When the sag value (eg, maximum sag value) of the 3D shape of the defocus region a is the smallest among all defocus regions, it is preferable to satisfy a relationship between the sag values: "the sag value of the 3D shape of the defocus region b is a value obtained by increasing the sag value of the 3D shape of the defocus region a" in the defocus regions with the number of 80% or more of all defocus regions. This means that not only the defocus region b but also the defocus regions c, d, e, . . . satisfying the above relationship exist (all of them have larger sag values than the defocus region a, and the amount of increase in the sag value is different from that of the defocus region b.).

The defocus region may be spherical, aspherical, toric, or a mixture thereof (for example, the center point of each defocus region is spherical, and the peripheral portion outside the center point is aspherical). A boundary between the center point and the peripheral portion may be provided at a point of ⅓ to ⅔ of the radius of the defocus region (or convex region) in plan view. However, it is preferable that at least the center points of the defocus region a and the defocus region b are in an appearance of a convex curved surface shape protruding toward the outside of the lens. Further, since more than half of the plurality of defocus regions (all defocus regions) are preferably arranged in the same cycle in plan view, the defocus regions are preferably spherical.

<Specific Example of the Spectacle Lens>

The mode of arrangement of the plurality of defocus regions is not particularly limited, and for example, can be determined from the viewpoint of the visibility of the defocus region from outside, designability provided by the defocus region, refractive power adjustment provided by the defocus region, etc.

A substantially circular defocus region may be arranged around the center portion of the spectacle lens, in an island shape (that is, separated from each other without being adjacent to each other) at equal intervals in circumferential and radial directions. As an example of the arrangement of the defocus regions in plan view, there is an example in which the defocus regions are arranged independently and discretely so that the center of each convex region becomes the vertex of an equilateral triangle (the center of each defocus region is placed at the vertex of a honeycomb structure: hexagonal arrangement). In this case, the distance between the defocus regions may be 1.0 to 2.0 mm. Further, the number of defocus regions may be 100 to 100,000.

Each defocus region is configured, for example, as follows. The diameter of the defocus region in plan view is preferably about 0.6 to 2.0 mm. The sag amount (protrusion height, protrusion amount) of the defocus region is approximately 0.1 to 10 μm, preferably 0.4 to 2.0 μm. The radius of curvature of the convex region is 50 to 250 mm, preferably about 86 mm.

There is no limit to the specific numerical value of the defocus power in each defocus region. However, for example, a minimum value of the defocus power provided by the defocus region on the spectacle lens is in a range of 0.50 to 4.50 D and a maximum value thereof is in a range of 3.00 to 10.00 D. The difference between the maximum and minimum values is preferably within a range of 1.00 to 5.00 D.

The "defocus power (amount)" refers to the difference between the refractive power of each defocus region and the refractive power of a portion other than each defocus region. In other words, the "defocus power (amount)" is a difference obtained by subtracting the refractive power of the base portion from the average value of the minimum refractive power and the maximum refractive power at a predetermined location of the defocus region. This specification shows a case where the defocus region is the convex region.

The "refractive power" as used herein refers to an average refractive power, which is the average value of the refractive power in a direction in which the refractive power is minimum and the refractive power in a direction in which the refractive power is maximum.

The lens substrate comprises, for example, a thermosetting resin material such as thiourethane, allyl, acryl, epithio, etc. Other resin material that provides a desired refractive power may also be selected as the resin material constituting the lens substrate. Further, the lens substrate may also comprise inorganic glass instead of the resin material.

The hard coat film is formed using, for example, thermoplastic resin or UV curable resin. The hard coat film can be formed by a method of immersing the lens substrate in a hard coat liquid, spin coating, etc. By coating with such a hard coat film, the durability of the spectacle lens is improved.

An antireflection film is formed by depositing an antireflection agent such as $ZrO_2$, $MgF_2$, $Al_2O_3$, etc., by vacuum deposition. By coating with such an antireflection film, the visibility of an image seen through the spectacle lens is improved.

As described above, a plurality of defocus regions are formed on the object-side surface of the lens substrate. Accordingly, when the surface is coated with the hard coat film and the antireflection film, a plurality of defocus regions are also formed by the hard coat film and the antireflection film following the defocus regions on the lens substrate.

In manufacturing a spectacle lens, first, a lens substrate is molded by a known molding method such as casting polymerization, etc. For example, by performing molding by cast polymerization using a mold having a molding surface with a plurality of concave portions, a lens substrate having a defocus region on at least one surface is obtained.

Then, after obtaining the lens substrate, subsequently, a hard coat film is formed on the surface of the lens substrate. The hard coat film can be formed by a method of immersing the lens substrate in a hard coat liquid, spin coating, etc.

After forming the hard coat film, an antireflection film is further formed on the surface of the hard coat film. The antireflection film can be formed by depositing an antireflection agent by vacuum deposition.

A spectacle lens having a plurality of defocus regions on the object-side surface, the defocus regions protruding toward the object-side, is obtained by the manufacturing method of such procedures.

The film thickness of the coating film formed through the above steps may be, for example, in a range of 0.1 to 100 μm (preferably 0.5 to 5.0 μm, more preferably 1.0 to 3.0 μm). However, the film thickness of the coating film is determined according to the functions required of the coating film, and is not limited to the exemplified range.

More than one layer coating can be formed on the coating film. Examples of such a coating film include various coating films such as an antireflection film, a water-repellent or hydrophilic antifouling film, an antifogging film, etc. A known technique can be applied to the method of forming these coating films.

<Method for Designing a Spectacle Lens>

The present disclosure can also be applied to a method for designing a spectacle lens. Specifically, the spectacle lens is designed by setting conditions so as to satisfy the above formula 1. The details of the contents of each configuration of this design method are omitted because they overlap with the description of the <spectacle lens>. The technical concept of the present disclosure is also reflected in the method of manufacturing a spectacle lens designed using this design method.

One configuration of the method for designing a spectacle lens will be described below.

"There is provided a method for designing a spectacle lens including a base region where a light flux incident from an object-side surface is emitted from an eyeball-side surface and converges on a retina through an eyeball; and a plurality of defocus regions surrounded by the base region and having a property that the light flux passing through at least a part of the defocus region is incident on the retina as a divergent light, the method comprising:

increasing a sag value of a 3D shape of the defocus region so that the defocus region uplifts with respect to a base surface: or decreasing the sag value of the 3D shape of the defocus region so that the defocus region sinks with respect to the base surface; thereby changing a focus position for a wearer, depending on a position of the defocus region on a spectacle lens, wherein a direction toward outside of a lens, which is a normal direction on the base surface, is shown by a positive sag value, and a direction toward inside of the lens, which is a normal direction on the base surface, is shown by a negative sag value, with the base surface of the base region as a reference."

At this time, it is preferable to determine the sag value of each defocus region, so as to correspond to the change of the focus position due to wearer-related parameters such as degree of the progression of myopia, choroidal condition, incident angle when wearing, eye aberration (field curvature), and retinal curvature.

The technical scope of the present disclosure is not limited to the above-described embodiments, but includes an embodiment with various modifications and improvements within a range where specific effects obtained by the constituent elements of the disclosure and their combinations can be derived.

The method for designing a spectacle lens according to one aspect of the present disclosure, may be performed using a computer device (for example, a computing unit in the device). That is, the technical concept of the present disclosure is also reflected on a spectacle lens design system using the computer device.

That is, using a computer device configured including hardware resources such as a computing unit equipped with CPU (Central Processing Unit), memories such as flash memory and HDD (Hard Disk Drive), an input/output interface, etc., and by causing the computing unit to execute a predetermined program pre-installed in the memory, the sag value of each defocus region may be set depending on the position of the defocus region on the spectacle lens. At this time, the wearer-related parameters may be stored in the memory or obtained from a cloud on a network.

Further, a predetermined program for causing the computer device to design a spectacle lens may be stored in a computer readable recording medium (for example, magnetic disk, optical disk, magneto-optical disk, semiconductor memory, etc.) and provided, as long as it can be installed on the computer device, or may be provided from the outside through the network such as the Internet or a dedicated line.

EXAMPLES

The present disclosure will be specifically described by showing examples. The disclosure is not limited to the following examples.

Examples 1A to 1C

The following lens substrate was produced. No other substance was laminated on the lens substrate. Regarding prescription power, S (spherical power) was 0.00 D and C (astigmatic power) was 0.00 D.

Diameter of the lens substrate in plan view: 100 mm

Type of the lens substrate: PC (polycarbonate)

Refractive index of the lens substrate: 1.589

Base curve of the lens substrate: 3.30 D

Surface on which convex regions are formed: object-side surface

Shape of the convex region: spherical

Shape of the convex region in plan view: a perfect circle (diameter 1 mm)

Arrangement of convex regions in plan view: each convex region is arranged independently and discretely so that the center of each convex region is the vertex of an equilateral triangle (the center of each convex region is arranged at the vertex of a honeycomb structure)

Range where the convex regions are formed: within a circle with a radius of 23.5 mm from the center of the lens (excluding a regular hexagonal region inscribed in a circle with a radius of 3.0 mm from the center of the lens)

Pitch between the convex regions (distance between centers of the convex regions): 1.5 mm In examples 1A to 1C, the segment power decreased from the lens center (closer to the lens center) toward the lens peripheral portion (closer to the lens periphery).

Figure 7:
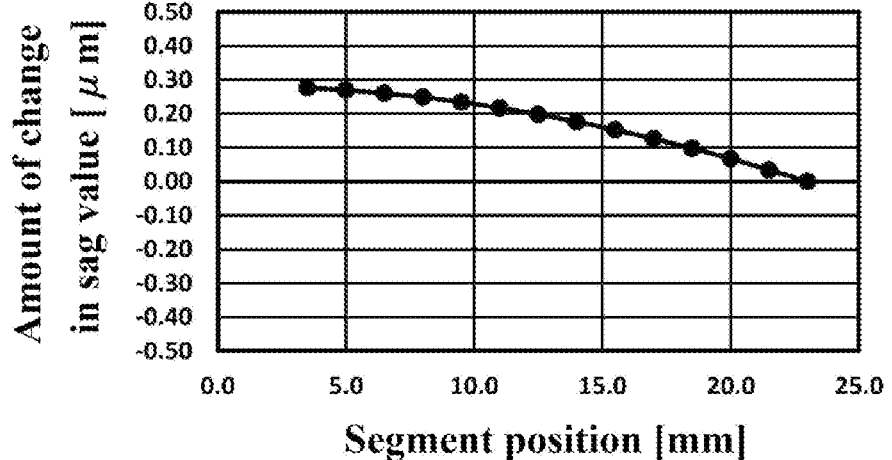
FIG. 7 is a graph of example 1A, in which the vertical axis represents the amount of change in the sag value from the reference (unit: μm), and the horizontal axis represents the position of the center of the defocus region in plan view (the origin is the center of the lens) (unit: mm).

FIG. 7 is a graph of example 1A, in which the vertical axis represents the amount of change in the sag value from the reference (unit: μm), and the horizontal axis represents the position of the center of the defocus region in plan view (the origin is the center of a lens) (unit: mm). Hereinafter, this position is also called a segment position.

Figure 8:
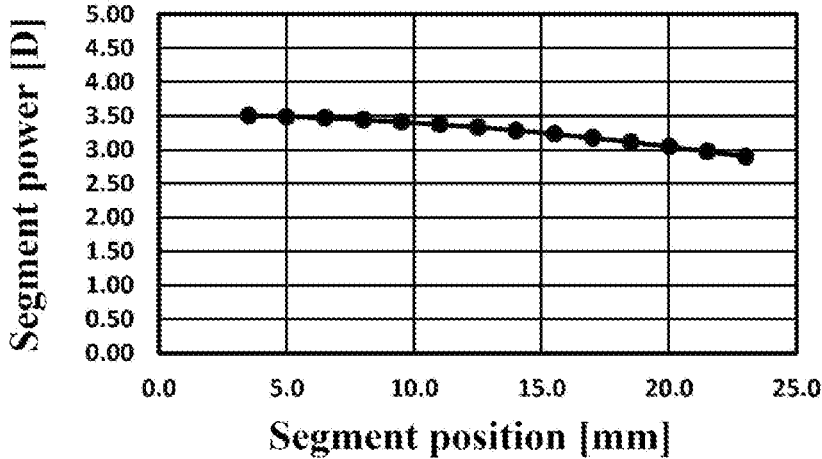
FIG. 8 is a graph of example 1A, in which the vertical axis represents a segment power (unit: D) and the horizontal axis represents the position of the center of the defocus region in plan view (the origin is the center of the lens) (unit: mm).

FIG. 8 is a graph of example 1A, in which the vertical axis represents a segment power (unit: D) and the horizontal axis represents the position of the center of the defocus region in plan view (the origin is the center of the lens) (unit: mm).

In example 1A, the 3D shape of the defocus region arranged on the outermost periphery was used as a reference (hereinafter, the maximum sag value of the 3D shape that serves as a reference is 0.74 μm). Then, the 3D shape of the defocus region near the center of the lens when viewed from the defocus region was designed by increasing the sag value of this reference 3D shape by a constant value to raise the height. The constant value was increased toward the center of the lens. The shape of the side surface of the base portion newly formed by raising the height, is a straight cross-sectional shape that connects the 3D shape and the base surface while keeping the bottom area of the defocus region constant (for example, FIGS. 1A-1C. The same applies for raising the height hereafter).

As a result, the segment power increased in the defocus region closer to the center of the lens, and the segment power in the defocus region decreased as moving away from the center of the lens.

Figure 9:
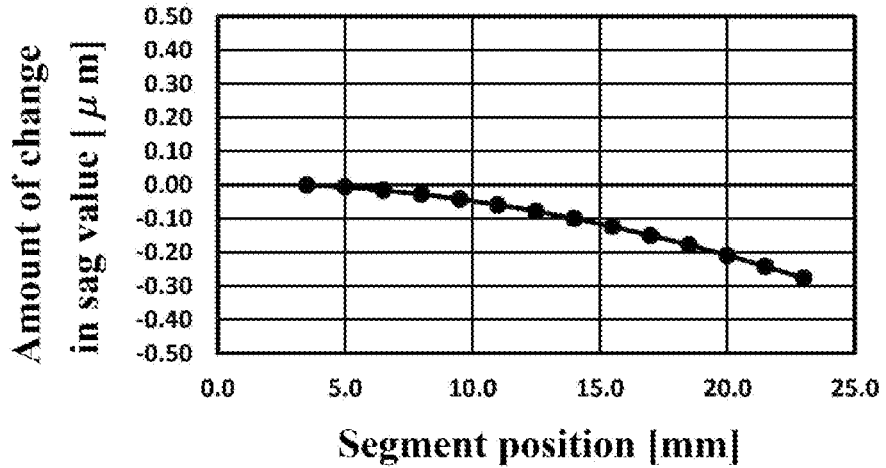
FIG. 9 is a graph of example 1B, in which the vertical axis represents the amount of change in the sag value from the reference (unit: μm), and the horizontal axis represents the position of the center of the defocus region in plan view (the origin is the center of the lens) (unit: mm).

FIG. 9 is a graph of example 1B, in which the vertical axis represents the amount of change in the sag value from the reference (unit: μm), and the horizontal axis represents the position of the center of the defocus region in plan view (the origin is the center of the lens) (unit: mm).

FIG. 10 is a graph of example 1B, in which the vertical axis represents the segment power (unit: D) and the horizontal axis represents the position of the center of the defocus region in plan view (the origin is the center of the lens) (unit: mm).

In Example 1B, the 3D shape of the defocus region arranged at the position closest to the center of the lens was used as a reference. Then, the 3D shape of the defocus region near the periphery of the lens when viewed from the defocus region was designed by decreasing the sag value of this reference 3D shape by a constant value to dig it down. The constant value was increased and the amount of decrease is increased as moving away from the center of the lens.

As a result, the segment power is increased in the defocus region closer to the center of the lens, and the segment power in the defocus region is decreased as moving away from the center of the lens.

Figure 11:
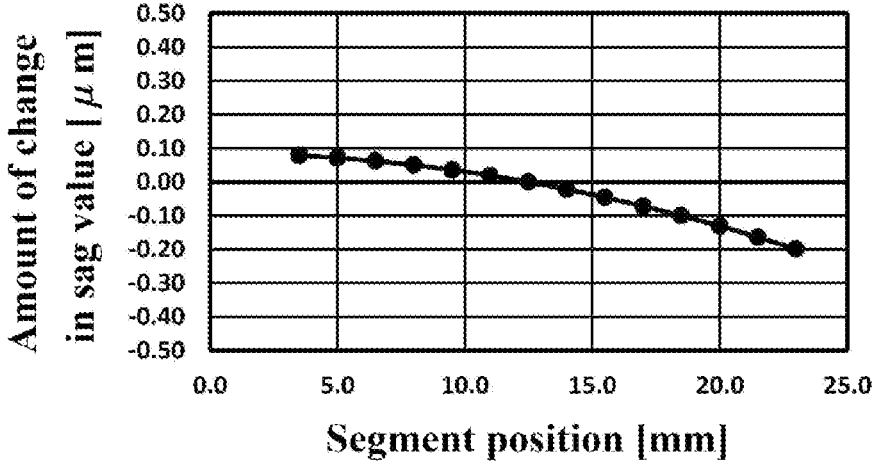
FIG. 11 is a graph of example 1C, in which the vertical axis represents the amount of increase in the sag value from the reference (unit: μm), and the horizontal axis represents the position of the center of the defocus region in plan view (the origin is the center of the lens) (unit: mm).

FIG. 11 is a graph of example 1C, in which the vertical axis represents the amount of increase in the sag value from the reference (unit: μm), and the horizontal axis represents the position of the center of the defocus region in plan view (the origin is the center of the lens) (unit: mm).

Figure 12:
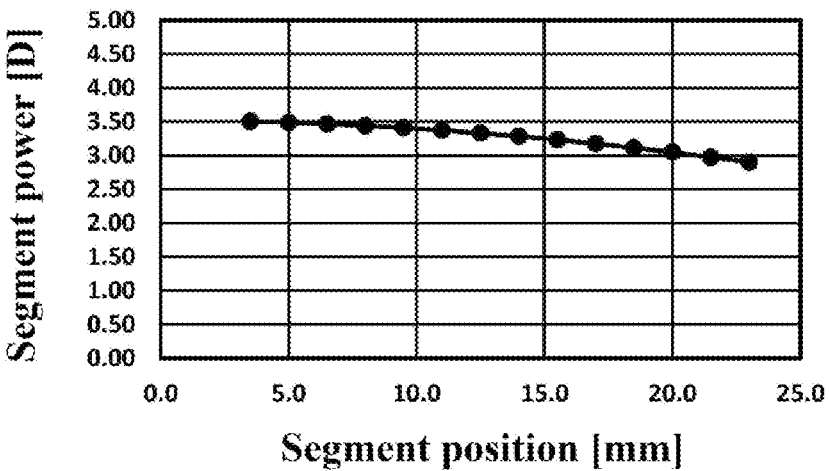
FIG. 12 is a graph of example 1C, in which the vertical axis represents the segment power (unit: D) and the horizontal axis represents the position of the center of the defocus region in plan view (the origin is the center of the lens) (unit: mm).

FIG. 12 is a graph of example 1C, in which the vertical axis represents the segment power (unit: D) and the horizontal axis represents the position of the center of the defocus region in plan view (the origin is the center of the lens) (unit: mm).

In Example 1C, the 3D shape of the defocus region whose planar view center is 12.5 mm away from the center of the lens, was used as a reference.

The 3D shape of the defocus region near the center of the lens when viewed from the defocus region was designed by increasing the sag value of this reference 3D shape by a constant value to raise the height. The constant value was increased toward the center of the lens.

The 3D shape of the defocus region near the periphery of the lens when viewed from the defocus region was designed by decreasing the sag value of this reference 3D shape by a constant value to dig it down. The constant value was increased and the amount of decrease is increased as moving away from the center of the lens.

As a result, the segment power was increased in the defocus region closer to the center of the lens, and the segment power in the defocus region was decreased as moving away from the center of the lens.

Examples 2A to 2C

In examples 2A to 2C, the segment power was increased from the center of the lens (closer to the center of the lens) toward the lens peripheral portion (closer to the periphery of the lens). Otherwise, the contents are the same as those described in example 1.

Figure 13:
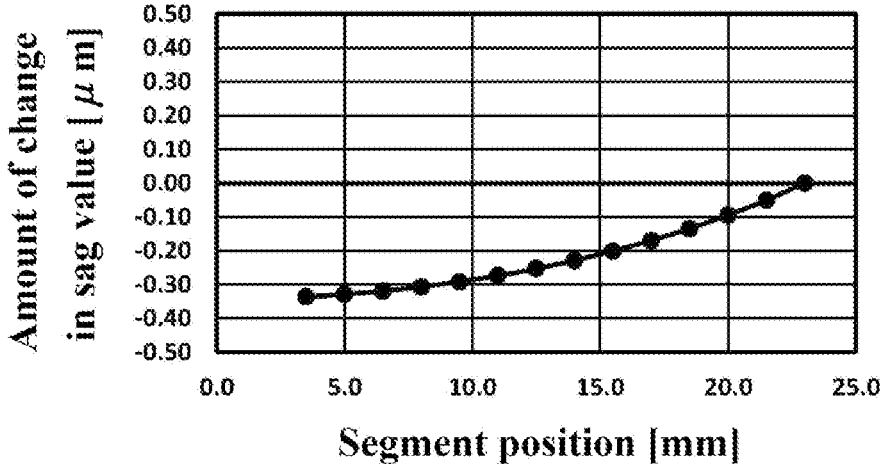
FIG. 13 is a graph of example 2A, in which the vertical axis represents the amount of change in the sag value from the reference (unit: μm), and the horizontal axis represents the position of the center of the defocus region in plan view (the origin is the center of the lens) (unit: mm).

FIG. 13 is a graph of example 2A, in which the vertical axis represents the amount of change in the sag value from the reference (unit: μm), and the horizontal axis represents the position of the center of the defocus region in plan view (the origin is the center of the lens) (unit: mm).

Figure 14:
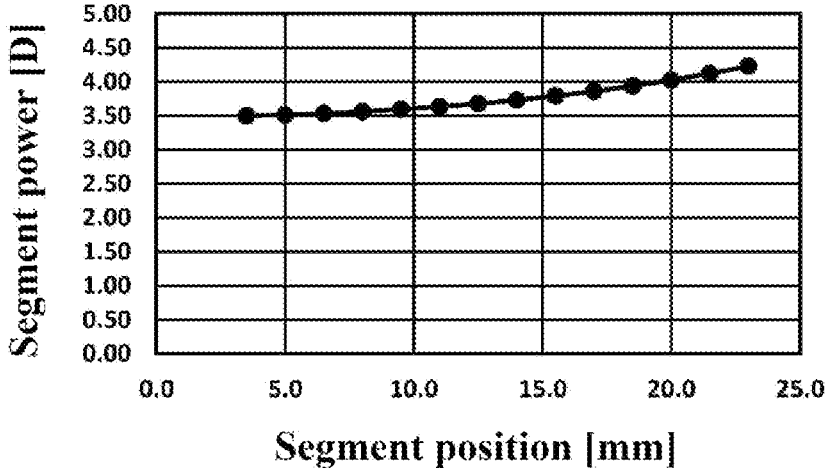
FIG. 14 is a graph of example 2A, in which the vertical axis represents the segment power (unit: D) and the horizontal axis represents the position of the center of the defocus region in plan view (the origin is the center of the lens) (unit: mm).

FIG. 14 is a graph of example 2A, in which the vertical axis represents the segment power (unit: D) and the horizontal axis represents the position of the center of the defocus region in plan view (the origin is the center of the lens) (unit: mm).

In example 2A, the 3D shape of the defocus region arranged on the outermost periphery was used as a reference.

Then, the 3D shape of the defocus region near the center of the lens when viewed from the defocus region was designed by decreasing the sag value of this reference 3D shape by a constant value to dig it down. The constant value was increased and the amount of decrease was increased toward the center of the lens.

As a result, the segment power was decreased in the defocus region closer to the center of the lens, and the segment power in the defocus region was increased as moving away from the center of the lens.

Figure 15:
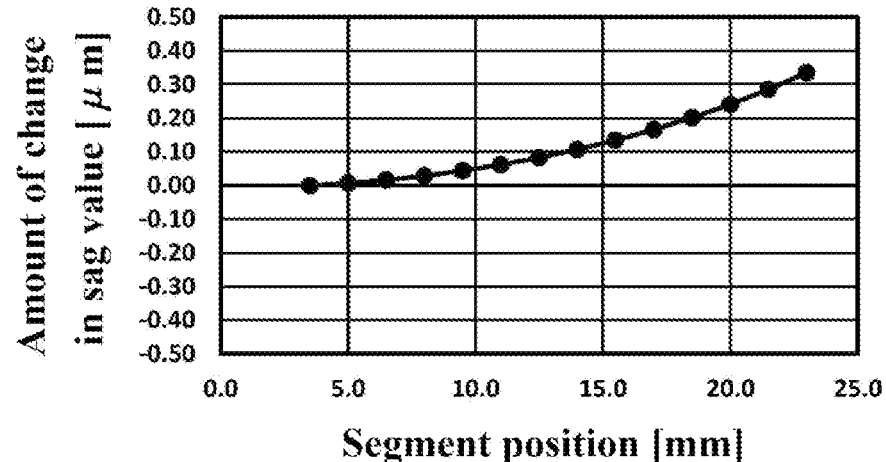
FIG. 15 is a graph of example 2B, in which the vertical axis represents an amount of change in the sag value from the reference (unit: μm), and the horizontal axis represents the position of the center of the defocus region in plan view (the origin is the center of the lens) (unit: mm).

FIG. 15 is a graph of example 2B, in which the vertical axis represents the amount of change in the sag value from the reference (unit: μm), and the horizontal axis represents the position of the center of the defocus region in plan view (the origin is the center of the lens) (unit: mm).

Figure 16:
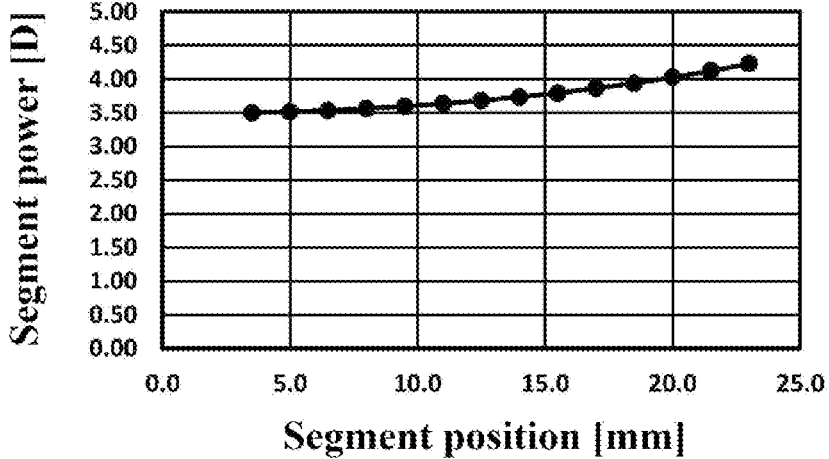
FIG. 16 is a graph of example 2B, in which the vertical axis represents the segment power (unit: D) and the horizontal axis represents the position of the center of the defocus region in plan view (the origin is the center of the lens) (unit: mm).

FIG. 16 is a graph of example 2B, in which the vertical axis represents the segment power (unit: D) and the horizontal axis represents the position of the center of the defocus region in plan view (the origin is the center of the lens) (unit: mm).

In example 2B, the 3D shape of the defocus region arranged at the position closest to the center of the lens, was used as a reference. Then, the 3D shape of the defocus region near the periphery of the lens when viewed from the defocus region was designed by increasing the sag value of this reference 3D shape by a constant value to raise the height. The constant value was increased as moving away from the center of the lens.

As a result, the segment power was decreased in the defocus region closer to the center of the lens, and the segment power in the defocus region was increased as moving away from the center of the lens.

Figure 17:
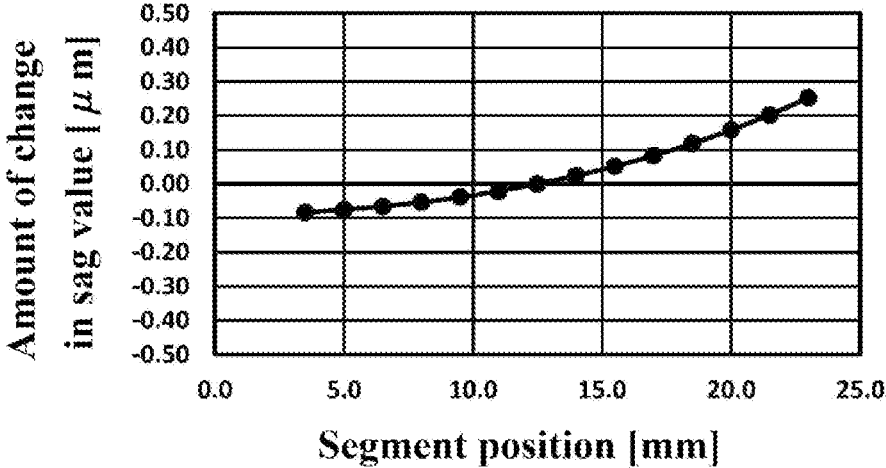
FIG. 17 is a graph of example 2C, in which the vertical axis represents the amount of increase in the sag value from the reference (unit: μm), and the horizontal axis represents the position of the center of the defocus region in plan view (the origin is the center of the lens) (unit: mm).

FIG. 17 is a graph of example 2C, in which the vertical axis represents the amount of increase in the sag value from the reference (unit: μm), and the horizontal axis represents the position of the center of the defocus region in plan view (the origin is the center of the lens) (unit: mm).

Figure 18:
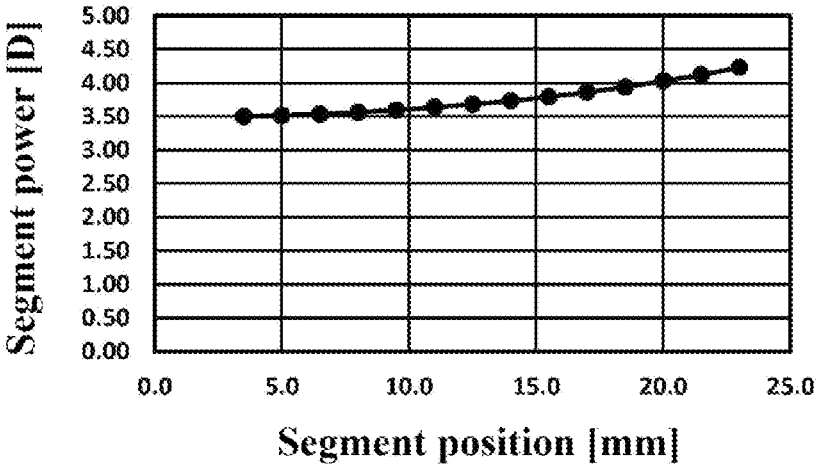
FIG. 18 is a graph of example 2C, in which the vertical axis represents the segment power (unit: D) and the horizontal axis represents the position of the center of the defocus region in plan view (the origin is the center of the lens) (unit: mm).

FIG. 18 is a graph of example 2C, in which the vertical axis represents the segment power (unit: D) and the horizontal axis represents the position of the center of the defocus region in plan view (the origin is the center of the lens) (unit: mm).

In example 2C, the 3D shape of the defocus region whose planar view center is 12.5 mm away from the lens center, was used as a reference.

The 3D shape of the defocus region near the center of the lens when viewed from the defocus region was designed by decreasing the sag value of this reference 3D shape by a constant value to dig it down. The constant value was increased and the amount of decrease was increased toward the center of the lens.

The 3D shape of the defocus region near the periphery of the lens when viewed from the defocus region was designed by increasing the sag value of this reference 3D shape by a constant value to raise the height. The constant value was increased as moving away from the center of the lens.

As a result, the segment power was decreased in the defocus region closer to the center of the lens, and the segment power in the defocus region was increased as moving away from the center of the lens.

DESCRIPTION OF SIGNS AND NUMERALS

1 . . . Base region
1s . . . Base surface

2 . . . Defocus region
3 . . . . Base portion
4 . . . Concave portion

The invention claimed is:

1. A spectacle lens, comprising:

a base region where a light flux incident from an object-side surface is emitted from an eyeball-side surface and converges on a retina through an eyeball; and a plurality of defocus regions surrounded by the base region and having a property that the light flux passing through at least a part of the defocus region is incident on the retina as a divergent light, the defocus region including a defocus region a provided at a predetermined position A and a defocus region b provided at a predetermined position B on a spectacle lens, wherein when a direction toward outside of a lens, which is a normal direction on a base surface, is shown by a positive sag value, and a direction toward inside of the lens, which is a normal direction on the base surface, is shown by a negative sag value, with the base surface of the base region as a reference, a sag value of a 3D shape of the defocus region b is a value in which a sag value of a 3D shape of the defocus region a is increased, wherein at least center points of the defocus region a and the defocus region b are in an appearance of a curved shape protruding toward outside of the lens, and wherein a radius of curvature at the center point of the defocus region a is equal to a radius of curvature at the center point of the defocus region b.

2. The spectacle lens according to claim 1, wherein an amount of increase in the sag value of the 3D shape is constant.

3. The spectacle lens according to claim 1, wherein a bottom area of the defocus region a is equal to a bottom area of the defocus region b.

4. The spectacle lens according to claim 1, wherein the predetermined position A is a position near a periphery of the lens, and the predetermined position B is a position near a center of the lens, or the predetermined position A is a position near the center of the lens, and the predetermined position B is a position near the periphery of the lens.

5. The spectacle lens according to claim 1, wherein a sag value near the base region in the 3D shape of the defocus region a is negative.

6. The spectacle lens according to claim 1, wherein in a defocus region T that is a gathering of defocus regions with a number of 80% or more of all defocus regions and includes the defocus region b and the defocus region a, a radius of curvature at each center point is equal, and the number of defocus regions having the same sag value as that of the defocus region a is 10 to 90%, and the number of defocus regions having the same sag value as that of the defocus region b is 10 to 90%.

7. The spectacle lens according to claim 1, wherein an amount of increase in the sag value is constant, a bottom area of the defocus region a and a bottom area of the defocus region b are equal, the predetermined position A is a position near a periphery of the lens, and the predetermined position B is a position near a center of the lens, or the predetermined position A is a position near the center of the lens, and the predetermined position B is a position near the periphery of the lens, and in a defocus region T that is a gathering of defocus regions with a number of 80% or more of all defocus regions and includes the defocus region a and the defocus region b, a radius of curvature at each center point is equal, and the number of defocus regions having the same sag value as that of the defocus region a is 10 to 90%, and the number of defocus regions having the same sag value as that of the defocus region b is 10 to 90%.

8. The spectacle lens according to claim 1, wherein the spectacle lens is a myopia progression suppressing lens.

9. A method for designing a spectacle lens including a base region where a light flux incident from an object-side surface is emitted from an eyeball-side surface and converges on a retina through an eyeball; and a plurality of defocus regions surrounded by the base region and having a property that a light flux passing through at least a part of the defocus region is incident on the retina as a divergent light, the method comprising:

increasing a sag value of a 3D shape of the defocus region so that the defocus region uplifts with respect to a base surface; or decreasing the sag value of the 3D shape of the defocus region so that the defocus region sinks with respect to the base surface; thereby changing a focus position for a wearer, depending on a position of the defocus region on a spectacle lens, wherein a direction toward outside of a lens, which is a normal direction on the base surface, is shown by a positive sag value, and a direction toward inside of the lens, which is a normal direction on the base surface, is shown by a negative sag value, with the base surface of the base region as a reference.

10. The method for designing a spectacle lens according to claim 9, wherein the focus position is changed by changing a value obtained in such a way that a volume of a portion between the defocus region and the base surface and having a negative sag value is subtracted from a volume of a portion between the defocus region and the base surface and having a positive sag value, and a value thus obtained is divided by a bottom area of the defocus region.

\* \* \* \* \*